(12) United States Patent
Cullen

(10) Patent No.: US 6,745,619 B2
(45) Date of Patent: Jun. 8, 2004

(54) DIAGNOSTIC METHOD FOR VARIABLE COMPRESSION RATIO ENGINE

(75) Inventor: Michael John Cullen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 144 days.

(21) Appl. No.: 10/003,511

(22) Filed: Oct. 22, 2001

(65) Prior Publication Data

US 2003/0074956 A1 Apr. 24, 2003

(51) Int. Cl.⁷ .............................................. G01M 15/00
(52) U.S. Cl. .......................... 73/116; 73/115; 73/118.1; 73/118.2
(58) Field of Search ...................... 73/115, 116–118.2

(56) References Cited

U.S. PATENT DOCUMENTS

| | | |
|---|---|---|
| 4,236,552 A | 12/1980 | Rayboy |
| 4,236,873 A | 12/1980 | Sherman et al. |
| 4,246,873 A | 1/1981 | Lih-Liaw |
| 4,286,552 A | 9/1981 | Tsutsumi |
| 4,469,055 A | 9/1984 | Caswell |
| 4,505,152 A | 3/1985 | Haddox |
| 4,805,571 A | 2/1989 | Humphrey |
| 4,807,581 A | 2/1989 | Nishikawa et al. |
| 4,834,031 A | 5/1989 | Katoh et al. |
| 4,860,711 A | 8/1989 | Morikawa |
| 5,146,879 A | 9/1992 | Kume et al. |
| 5,255,637 A | 10/1993 | Schechter |
| 5,287,827 A | 2/1994 | Almendinger et al. |
| 5,417,185 A | 5/1995 | Beattie |
| 5,562,068 A | 10/1996 | Sugimoto et al. |
| 5,595,146 A | 1/1997 | Bollig et al. |
| 5,682,854 A | 11/1997 | Ozawa |
| 5,724,863 A | 3/1998 | Kramer et al. |
| 5,791,302 A | 8/1998 | Ma |
| 5,819,702 A | 10/1998 | Mendler |
| 5,845,613 A | 12/1998 | Yoshikawa |
| 5,862,790 A | 1/1999 | Dai et al. |
| 5,865,092 A | 2/1999 | Woudwyk |
| 5,960,750 A | 10/1999 | Kreuter |
| 6,115,664 A | 9/2000 | Cullen et al. |
| 6,125,801 A | 10/2000 | Mendler |
| 6,135,086 A | 10/2000 | Clarke et al. |
| 6,408,804 B1 * | 6/2002 | Rao et al. ................. 123/48 B |

FOREIGN PATENT DOCUMENTS

| | | |
|---|---|---|
| EP | 0-484-553 A1 | 5/1992 |
| JP | 62237043 | 10/1987 |
| JP | 03092552 | 4/1991 |

OTHER PUBLICATIONS

09/682263 filed Aug. 10, 2001—Connecting Rod for a Variable Compression Engine—Rao et al.

* cited by examiner

Primary Examiner—Kamand Cuneo
Assistant Examiner—Monica D. Harrison
(74) Attorney, Agent, or Firm—Carlos L. Hanz

(57) ABSTRACT

A diagnostic method for a motor vehicle having an internal combustion engine operable in a plurality of compression ratio operating states includes the steps of determining a change in idle air flow of the engine as the engine is operated in selected ones of the compression ratio operating states, and evaluating operation of the internal combustion engine based at least in part on the change in idle air flow.

23 Claims, 8 Drawing Sheets

DIAGNOSTIC METHOD FOR VARIABLE COMPRESSION RATIO ENGINE

BACKGROUND OF THE INVENTION

1. Field of the Invention

The present invention relates generally to variable compression ratio internal combustion engines. More particularly, the invention relates to a method and system for diagnosing operation of a compression ratio setting apparatus of a variable compression ratio internal combustion engine.

2. Background Art

The "compression ratio" of an internal combustion engine is defined as the ratio of the cylinder volume when the piston is at bottom-dead-center (BDC) to the cylinder volume when the piston is at top-dead-center (TDC). Generally, the higher the compression ratio, the higher the thermal efficiency and fuel economy of the internal combustion engine. So-called "variable compression ratio" internal combustion engines have been developed, for example, having higher compression ratios during low load conditions and lower compression ratios during high load conditions. Various techniques have been disclosed for varying compression ratio, including for example, using "sub-chambers and "sub-pistons" to vary the volume of a cylinder, see for example patents U.S. Pat. No. 4,246,873 and U.S. Pat. No. 4,286,552; varying the actual dimensions of all or a portion of a piston attached to a fixed length connecting rod, see U.S. Pat. No. 5,865,092; varying the actual length of the connecting rod itself, see U.S. Pat. Nos. 5,724,863 and 5,146,879; and using eccentric rings or bushings either at the lower "large" end of a connecting rod or the upper "small" end of the connecting rod for varying the length of the connecting rod or height of the reciprocating piston, see U.S. Pat. No. 5,562,068, U.S. Pat. No. 5,960,750, U.S. Pat. No. 5,417,185 and Japanese Publication JP-03092552.

When controlling the operation of a variable compression ratio engine, it is essential to accurately and reliably determine whether a compression ratio setting device for varying an engine's compression ratio is functioning as required. This is especially important, for example, when controlling ignition timing in the engine. In order to maximize fuel economy while minimizing engine knock, especially in high load conditions, it may be desirable to vary the engine's ignition timing based on a detected compression ratio of the engine. See for example U.S. Pat. No. 4,834,031. In such case, a dedicated sensor, such as combustion pressure sensor or piston position sensor, is used to determine the compression ratio operating mode of the variable compression ratio internal combustion engine.

As such, the inventor herein has recognized the need for a method of diagnosing operation of a variable compression ratio device that does not rely on dedicated sensors within the internal combustion engine.

SUMMARY OF THE INVENTION

A method is provided for diagnosing operation of an internal combustion engine having a plurality of compression ratio operating states. The method includes the steps of determining a change in idle air flow of the engine as the engine is operated in selected ones of the compression ratio operating states; and evaluating operation of the internal combustion engine based at least in part on the change in idle air flow. Preferably, a first idle air flow is determined while the engine is operated a first of the compression ratio operating states, and a second idle air flow determined at a second of the compression ratio operating states. A difference between the first and second idle air flows is determined and an indication of engine operation provided based on a comparison of the difference to a predetermined limit. The indication can be for example a status flag set in computer memory, and/or an audible or visible indication. The disclosed method can be used with a variable compression ratio engine having discrete compression ratio operating modes, for example a "high" and a "low" compression ratio, or with a continuously variable compression ratio engine having a plurality of intermediate compression ratio operating modes.

Advantageously, the operation of a variable compression engine in one or more compression ratio operating states can be accurately and reliably determined without relying on one or more dedicated sensors, such as pressure sensors or proximity or position sensors. The methods described herein, which can be implemented solely in computer code, can be used for diagnostic purposes to evaluate operation of a compression ratio setting apparatus, such as a retractable connecting rod or piston head or combustion sub-chamber. The disclosed invention therefore reduces costs and complexity associated with the manufacture, assembly, operation and maintenance of a variable compression ratio internal combustion engine.

In accordance with a related aspect of the present invention, a corresponding system is provided for operating a variable compression ratio internal combustion engine. The system includes a sensor disposed within the engine for generating a signal representing idle air flow into the engine, a compression ratio setting apparatus for configuring the engine in selected compression ratio operating states of the engine, and a controller in communication with the sensor and the compression ratio apparatus for determining a change in the idle air flow of the engine as the engine is commanded by the controller to operate the engine in selected ones of the compression ratio operating states and for evaluating operation of the internal combustion engine based at least in part on the change in idle air flow. Preferably, the sensor is an air mass flow (MAF) sensor disposed within the throttle port of the engine. A notification device in communication with the controller provides information relating to the operation of the compression ratio setting apparatus to a vehicle operator.

Further advantages, objects and features of the invention will become apparent from the following detailed description of the invention taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numerals indicate like features and wherein.

DETAILED DESCRIPTION OF THE PREFERRED EMBODIMENTS

Figure 1:
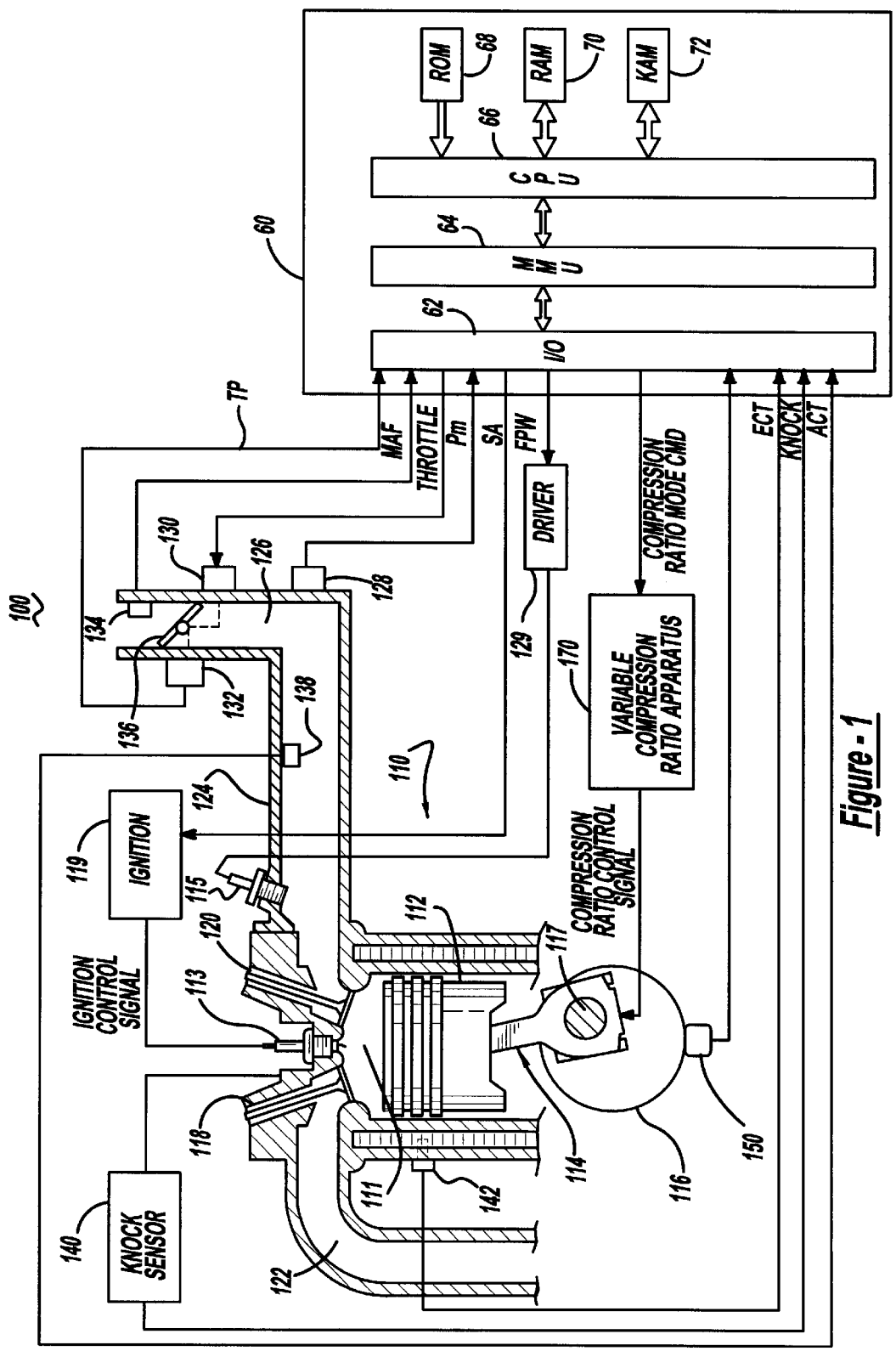
FIG. 1 is a diagram of an exemplary variable compression ratio internal combustion engine.

FIG. 1 shows an exemplary variable compression ratio internal combustion engine in accordance with the present invention. As will be appreciated by those of ordinary skill in the art, the present invention is independent of the particular underlying engine configuration and component designs, and as such can be used with a variety of different internal combustion engines having more than one compression ratio operating modes. The engine for example can be constructed and operated as a discrete compression ratio engine operating for example at a high compression or at low compression, or as a continuously variable compression ratio engine capable of operating at a any number of discrete compression ratios. Similarly, the present invention is not limited to any particular type of apparatus or method required for setting or varying the compression ratio of the internal combustion engine.

Referring again to FIG. 1, the engine 110 includes a plurality of cylinders (only one shown), each having a combustion chamber 111, a reciprocating piston 112, and intake and exhaust valves 120 and 118 for communicating the combustion chamber 111 with intake and exhaust manifolds 124 and 122. The piston 112 is coupled to a connecting rod 114, which itself is coupled to a crankpin 117 of a crankshaft 116. Fuel is provided to the combustion chamber 111 via a fuel injector 115 and is delivered in proportion to a fuel pulse width (FPW) determined by an electronic engine or vehicle controller 60 (or equivalent microprocessor-based controller) and electronic driver circuit 129. Air charge into the intake manifold 124 is nominally provided via an electronically controlled throttle plate 136 disposed within throttle body 126. Ignition spark is provided to the combustion chamber 111 via spark plug 113 and ignition system 119 in accordance with a spark advance (or retard) signal (SA) from the electronic controller 60.

As shown in FIG. 1, the controller 60 nominally includes a microprocessor or central processing unit (CPU) 66 in communication with computer readable storage devices 68, 70 and 72 via memory management unit (MMU) 64. The MMU 64 communicates data (including executable code instructions) to and from the CPU 66 and among the computer readable storage devices, which for example may include read-only memory (ROM) 68, random-access memory (RAM) 70, keep-alive memory (KAM) 72 and other memory devices required for volatile or non-volatile data storage. The computer readable storage devices may be implemented using any known memory devices such as programmable read-only memory (PROM's), electrically programmable read-only memory (EPROM's), electrically erasable PROM (EEPROM's), flash memory, or any other electrical, magnetic, optical or combination memory devices capable of storing data, including executable code, used by the CPU 66 for controlling the internal combustion engine and/or motor vehicle containing the internal combustion engine. Input/output (I/O) interface 62 is provided for communicating with various sensors, actuators and control circuits, including but not limited to the devices shown in FIG. 1. These devices include an engine speed sensor 150, electronic fuel control driver 129, ignition system 119, manifold absolute pressure sensor (MAP) 128, mass air flow sensor (MAF, "airmeter") 134, throttle position sensor 132, electronic throttle control motor 130, inlet air temperature sensor 138, engine knock sensor 140, and engine coolant temperature 142.

The engine 110 of FIG. 1 also includes and a variable compression ratio ("compression ratio setting") apparatus 170. In a non-limiting embodiment, the variable compression ratio apparatus 170 is operated to vary the effective length of the connecting rod 114, and thus the clearance volume and compression ratio of the engine. Such an apparatus is described, for example, in U.S. application Ser. No. 09/682,263, entitled "Connecting Rod for a Variable Compression Engine," which is owned by the assignee of the present invention and is hereby incorporated by reference in its entirety. The actual construction and configuration of the variable compression apparatus shown in FIG. 1 is not at all intended to limit the scope of claim protection for the inventions described herein.

In a non-limiting aspect of the present invention, the variable compression ratio apparatus of FIG. 1 is described below as operating in a "high" compression ratio mode (compression ratio of 13:1 and above) or a "low" compression ratio mode (compression ratio of 11:1 and below).

FIGS. 2 through 10 show preferred methods for operating a variable compression ratio internal combustion engine in accordance with the present invention. The methods are not limited in application to a particular engine or type of compression ratio setting apparatus, but are described herein for convenience with reference to the variable compression ratio engine of FIG. 1. The methods described herein can be used advantageously for determining whether a compression ratio setting apparatus of the engine is operating properly. Although the methods can be used alone or in combination with other vehicle and powertrain hardware and software diagnostics, the methods in accordance with the present invention rely on a determination in the change in idle air flow for a change in compression ratio as a independent estimate of the actual compression ratio of the variable compression ratio engine. The methods of the present invention are applicable to both discrete variable compression ratio systems, such as the two-state system described above having discrete "HI" and "LOW" compression ratio states, and continuously variable compression ratio systems having for example "HI" and "LOW" states representing limits on a continuous range of a compression ratio states.

Figure 2:
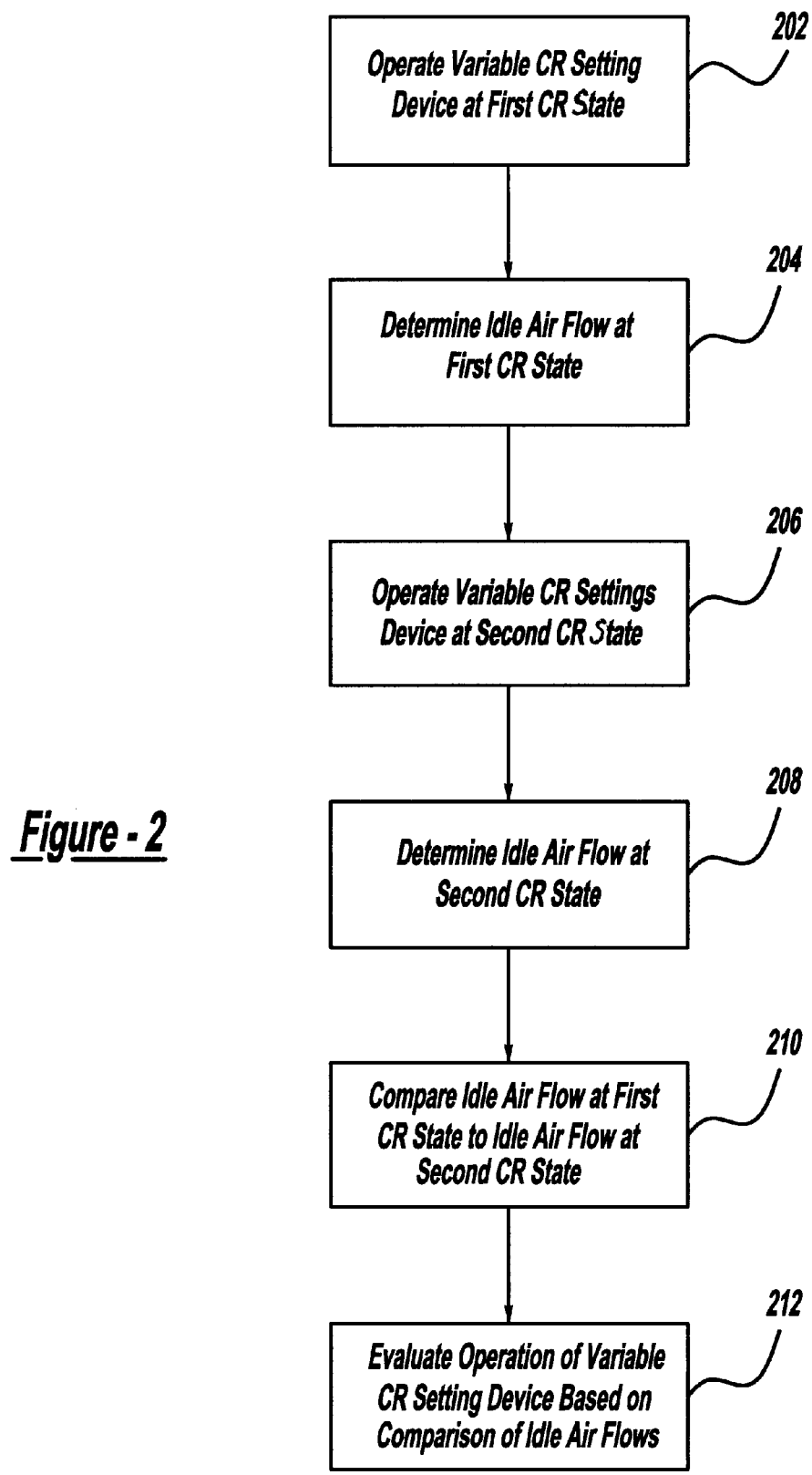
FIG. 2 is a flow diagram of a preferred method for operating a variable compression ratio internal combustion engine in accordance with the present invention.

Referring to FIG. 2, a diagnostic method includes the steps of commanding and operating a variable compression ratio internal combustion engine in a first compression ratio state, step 202, and then determining an air flow at the first compression ratio state while the engine is idling, step 204. The idle air flow can be measured or inferred using any known or suitable means. Although the idle air flow can be determined using a MAF sensor ("air meter") as described above with reference to FIG. 1, a manifold absolute pressure (MAP) sensor can also be used in combination with methods known in the art to determine the air flow. See for example U.S. Pat. No. 6,115,664, which is owned by the assignee of the present invention and is hereby incorporated by reference in its entirety. The engine is then operated in a second compression ratio state, step 206, and the idle air flow determined while operating the engine in an idle condition, step 208. The idle air flows are stored by a controller having suitable microprocessor, and a comparison made to evaluate the performance of the compression ratio setting apparatus and thus the variable compression ratio engine, steps 210 and 212.

Figure 3:
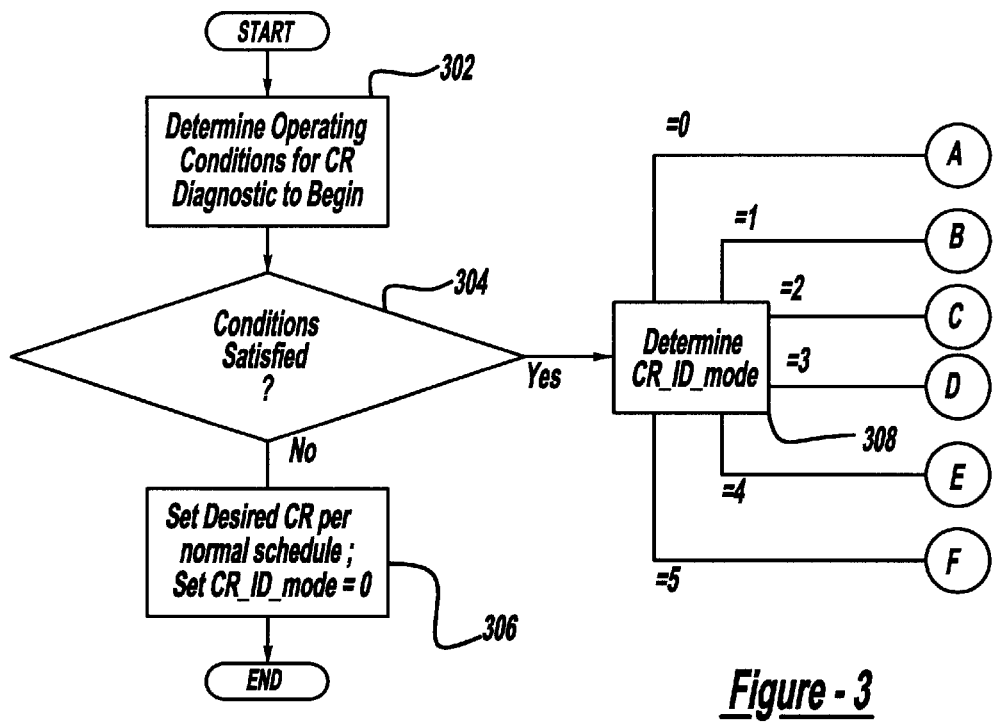
FIG. 3 is a flow diagram of a variable compression ratio diagnostic method in accordance with the present invention.

FIG. 3 shows a flow diagram of a diagnostic routine in accordance with the present invention. The routine is preferably embodied in computer software, which resides in computer memory and is controlled by one or more higher-level software executives or modules of the vehicle and/or engine controller. The compression ratio diagnostic is a so-called "state-machine" having a plurality of states represented by the variable "CR_ID_mode" stored in RAM. In accordance with a preferred method, CR_ID_mode includes a first state (CR_ID_mode=0) representing normal operation of the engine (excluding execution of the diagnostic routine), a second state (CR_ID_mode=1) requiring determination of idle air flow ("air mass") with the engine compression ratio set (preset) at "HI", a third state (CR_ID_mode=2) requiring the compression ratio to be set to "LOW", a fourth state (CR_ID_mode=3) requiring determination of idle air flow at low compression, a fifth state (CR_ID_mode=4) requiring the compression ratio to be reset to the initial setting (e.g., high compression), and a sixth state (CR_ID_mode=5) requiring a comparison of the high compression and low compression idle air flows to determine whether a possible error or fault condition exists related to the engine's compression ratio setting apparatus.

Figure 4:
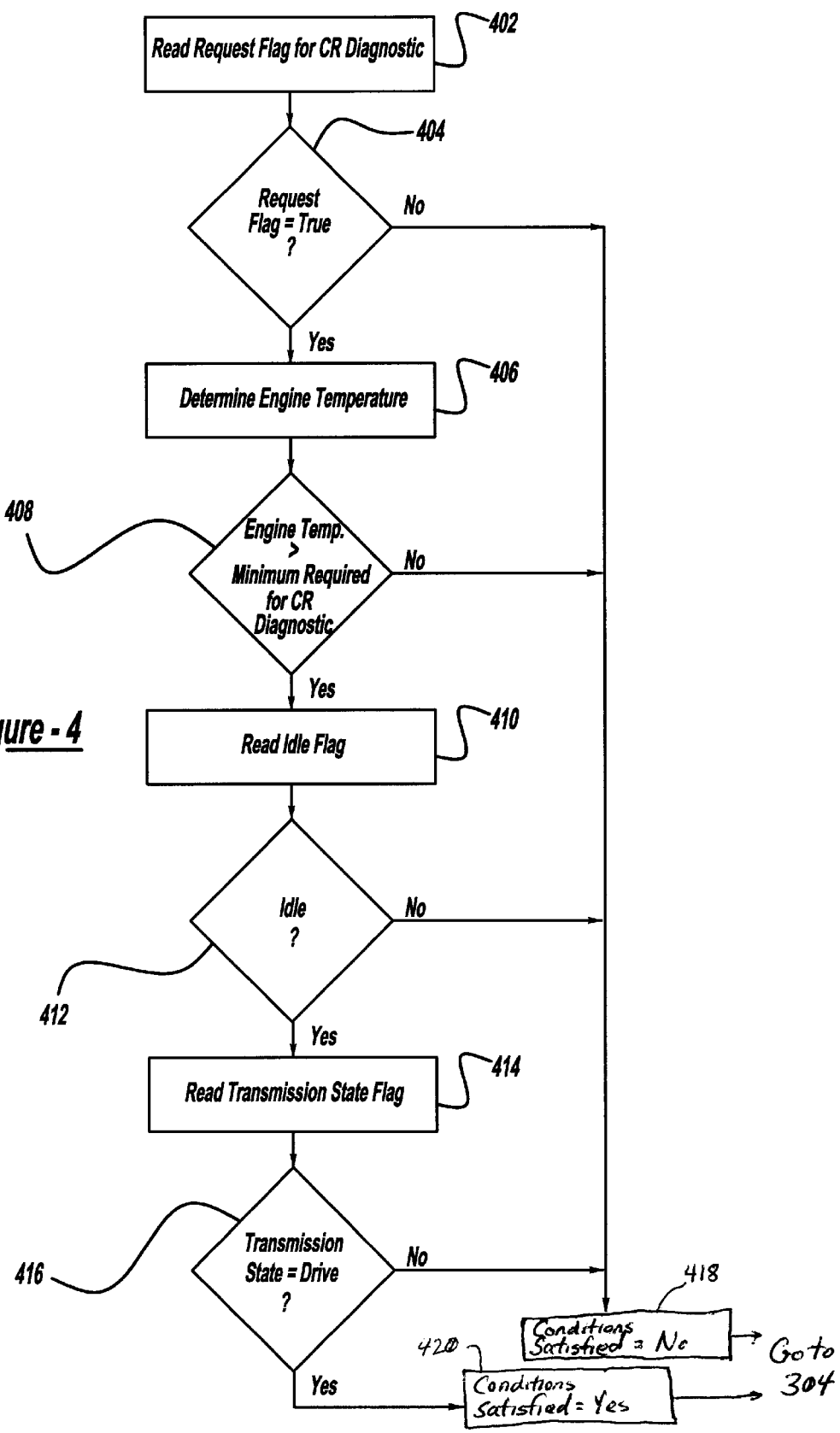
FIG. 4 is a flow diagram of a preferred method for determining whether requisite engine operating conditions exist prior to performing the diagnostic method of FIG. 3.

The diagnostic method shown in FIG. 3 first includes steps to determine whether the requisite engine operating conditions exist, steps 302 and 304. An exemplary check of relevant engine operating conditions is performed as shown in FIG. 4. Note, the steps shown in FIG. 4 are exemplary and nominally involve one or more checks of engine operating conditions or parameters that may effect the operation of the compression ratio setting apparatus. For example, if the compression ratio setting apparatus relies on oil pressure to configure the engine in one or more of the compression ratio operating modes, then oil temperature may be checked to ensure that the oil is within a prescribed range and thus at a required viscosity. Alternatively, as shown in FIG. 4, engine temperature can be determined and used as a measure of oil temperature.

Referring again to FIG. 4, a compression ratio diagnostic request flag (CR_ID_desired) is interrogated to determine whether an executive module of a corresponding vehicle or engine controller has requested a compression ratio diagnostic, step 402. If CR_ID_desired is set to "TRUE", step 404, then an engine temperature is determined in accordance with step 406. The engine temperature can be sensed or inferred using any known or suitable means. Preferably, an engine coolant temperature (ect) sensor 150 is used as described above with reference to FIG. 1. The engine coolant temperature ect is then compared to a predetermined minimum engine coolant temperature (CR_ID_MINECT) required to execute the compression ratio diagnostic, step 408. CR_ID_MINECT is stored in computer memory and can be derived empirically using engine test and/or calibration data. If ect exceeds CR_ID_MINECT, then an idle state flag (iscflg) is interrogated to determine whether the engine is in closed loop idle condition, steps 410 and 412. If iscflg equals "1", then a closed loop idle condition exists and a check of a transmission state flag (in_drive) is performed, steps 414 and 416. The closed loop idle condition is verified using an engine speed sensor as described above with reference to FIG. 1. In a vehicle with an automatic transmission, the PRDNL switch is used to indicate whether the transmission is in a drive state. If in_drive equals "TRUE", then the vehicle transmission is in a drive state and the compression ratio diagnostic is allowed to continue with step 308 of FIG. 3.

Alternatively, if the vehicle is equipped with a manual transmission, then a check is performed to verify that the transmission is in a neutral state.

Depending on the state (0-5) of the compression ratio diagnostic mode flag CR_ID_mode, the corresponding steps described below with reference to FIGS. 5 through 10 are performed. Otherwise, if the engine operating conditions are not satisfied in accordance with step 304, then the compression ratio of the engine is set in accordance with a predetermined schedule and CR_ID_mode is set to "0", step 306.

Figure 5:
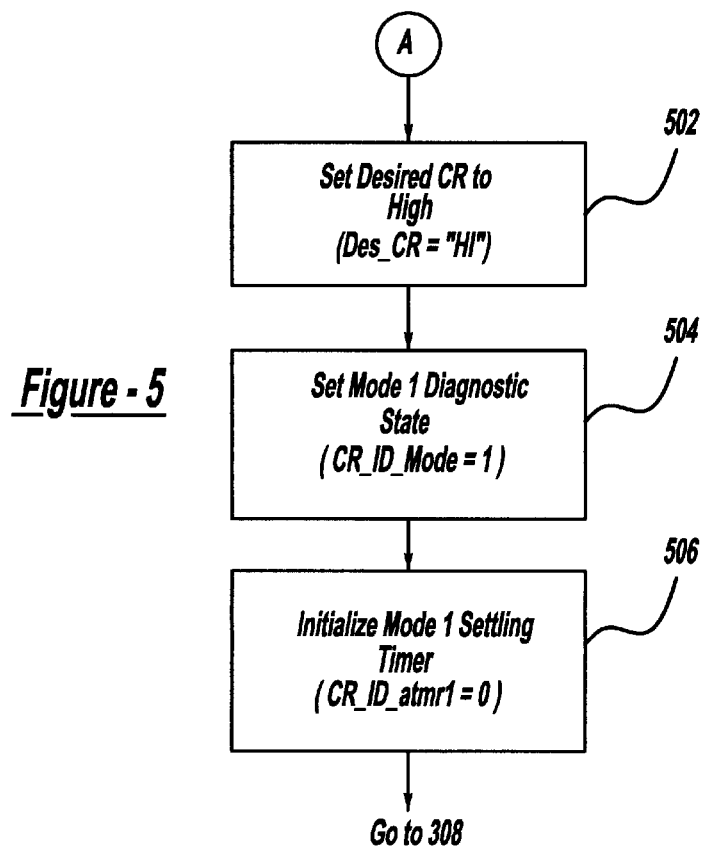
FIG. 5 is a flow diagram corresponding to a first diagnostic state of the method of FIG. 3.

FIG. 5 shows a flow diagram corresponding to a first diagnostic state (CR_ID_mode=0) of the method of FIG. 3. First, the desired compression ratio operating state of the internal combustion engine is set to a default or initial state, for example high compression (Des_CR="HI"), step 502. Alternatively, the default or initial state is established during prior operation of the engine, or during a start-up sequence of the engine. The diagnostic mode flag CR_ID_mode is then initialized to "1", step 504, to allow the determination of the idle air flow at high compression beginning during a subsequent pass-through of the diagnostic routine. A mode 1 settling timer (CR_ID_atmr1) is then initialized to "0", step 506, to allow additional settling time at idle and to ensure that any corrections to air flow calculation, e.g., throttle body air flow correction loop, have been made prior to the determination of the idle air flow at high compression. Control of the diagnostic routine is then returned to step 308 of FIG. 3.

Figure 6:
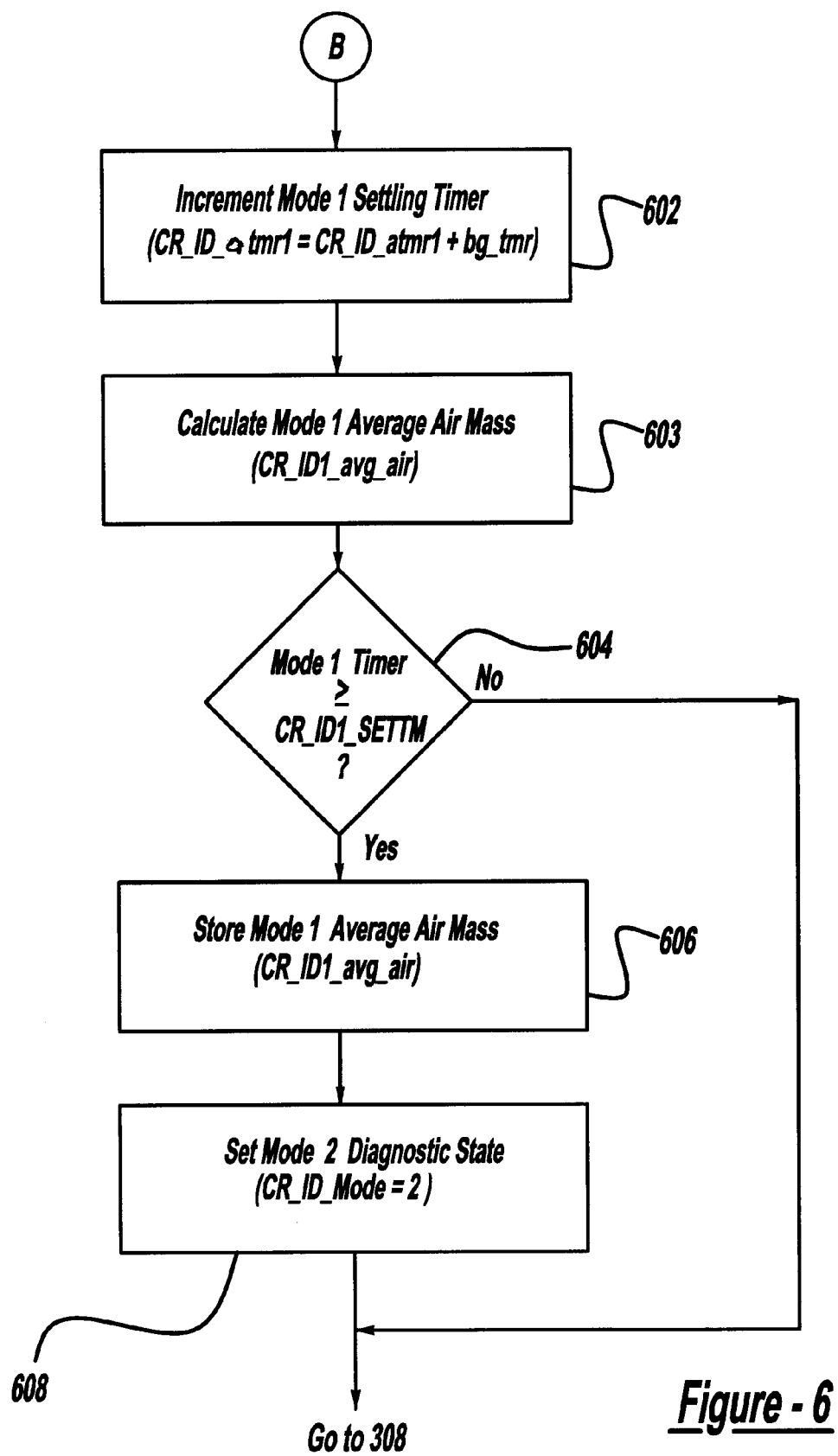
FIG. 6 is a flow diagram corresponding to a second diagnostic state of the method of FIG. 3.

FIG. 6 shows a flow diagram corresponding to a second diagnostic state (CR_ID_mode=1) of the method of FIG. 3. If CR_ID_mode=1 per step 308, then the mode 1 settling timer CR_ID_atmr1 is incremented by a predetermined amount (bg_timer) equal for example to the time elapsed since the previous calculation of CR_ID_atmr1, step 602. Nominally, bg_timer is equal to 0.01 seconds. CR_ID_atmr1 is then compared to a predetermined time limit (CR_ID1_SETTM) representative of a minimum amount of time required in mode 1 to ensure stable idle air flow readings from the airmeter, step 604. CR_ID1_SETTM represents an amount of time required for an engine's intake manifold to reach equilibrium, plus the time require for a rolling or filtered average of the idle air flow to reach an asymptotic state. CR_ID1_SETTM is a calibratable round scalar that can be determined empirically from engine test and/or calibration data. If CR_ID_atmr1 exceeds CR_ID1_SETTM, then the average air flow at high compression (CR_ID1_avg_air) is stored in computer memory, step 606. Preferably, CR_ID1_avg_air is determined as a filtered average over the predetermined period of time CR_ID1_SETTM using the following formula:

$$CR\_ID1\_\text{avg\_air} = (1 - CR\_ID1_{13}FK) * CR\_ID1\_\text{avg\_air(old)} + CR\_ID1\_FK * am,$$

where CR_ID1_FK is a filter constant (nominally 0.1), CR_ID1_avg_air(old) is the previous value of CR_ID1_avg_air, and am is current air mass reading from the air meter. The diagnostic mode flag CR_ID_mode is then initialized to "2", step 608.

Figure 7:
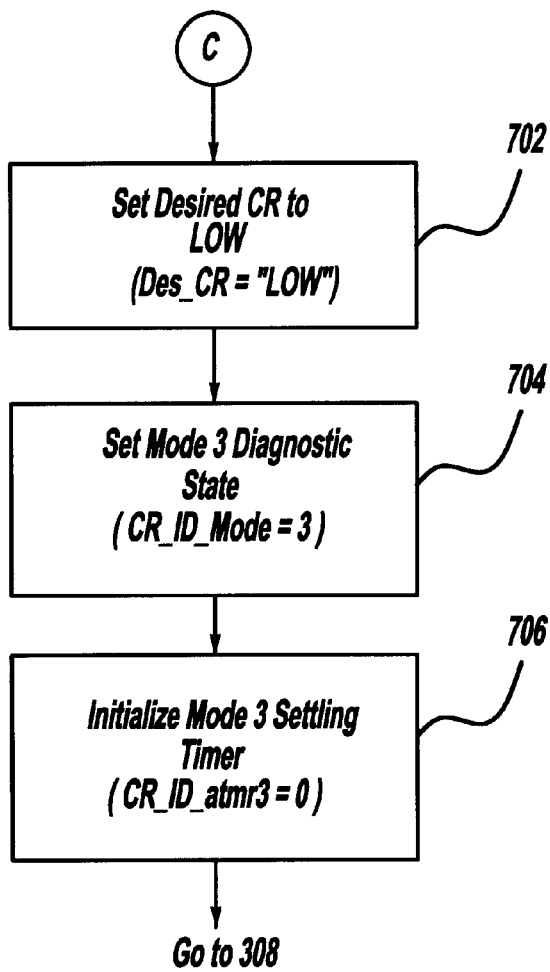
FIG. 7 is a flow diagram corresponding to a third diagnostic state of the method of FIG. 3.

FIG. 7 shows a flow diagram corresponding to a third diagnostic state (CR_ID_mode=2) of the method of FIG. 3.

Steps 702, 704 and 706 are analogous to steps 502, 504 and 506 described above with reference to FIG. 5, except that the compression ratio setting apparatus now configures the engine in a low compression ratio operating state (Des_CR="LOW"), step 702. The diagnostic mode flag CR_ID_mode is initialized to "3", step 704, to allow determination of the idle air flow at low compression. A mode 3 settling timer (CR_ID_atmr3) is then initialized to "0", step 706, to allow additional settling time at idle and to ensure that any corrections to air flow calculation have been made prior to the determination of the idle air flow at low compression. Control of the diagnostic routine is then returned to step 308 of FIG. 3.

Figure 8:
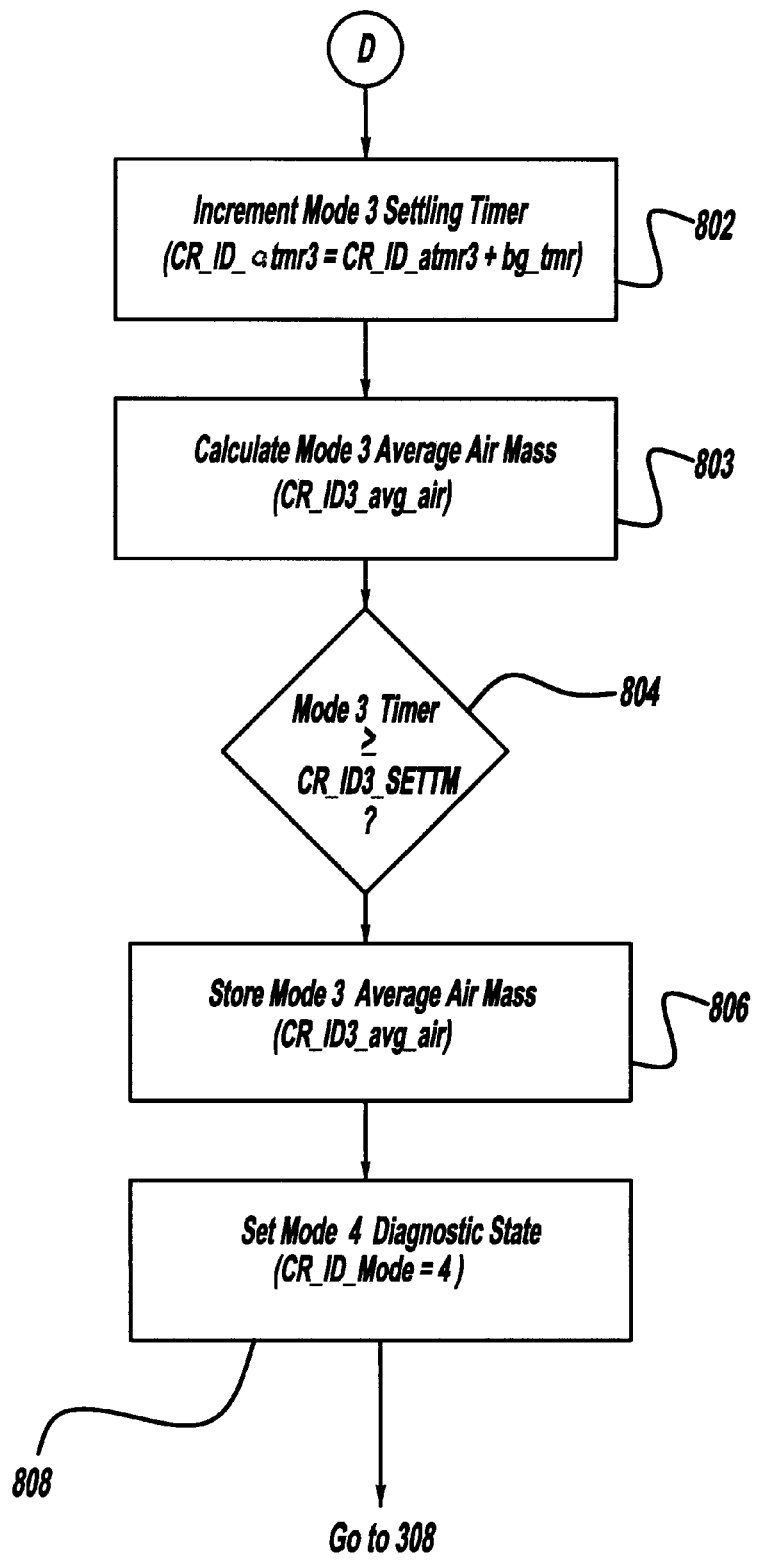
FIG. 8 is a flow diagram corresponding to a fourth diagnostic state of the method of FIG. 3.

FIG. 8 shows a flow diagram corresponding to a fourth diagnostic state (CR_ID_mode=3) of the method of FIG. 3. Steps 802, 804, 806 and 808 of FIG. 8 are likewise analogous to steps 602, 604, 606 and 608 of FIG. 6, except that the average air flow at low compression ratio (CD_ID3_avg_air) is determined after a mode 3 settling timer (CR_ID_atmr3) exceeds a predetermined time limit (CR_ID3_SETTM). CR_ID3_SETTM, like the counterpart variable for mode 1, is a calibratable round scalar that can be determined empirically from engine test and/or calibration data. If CR_ID_atmr3 exceeds CR_ID3_SETTM, then the average air flow CD_ID3_avg_air is stored in computer memory, step 806. CR_ID3_avg_air is likewise determined as a filtered average over the predetermined period of time CR_ID3_SETTM using a similar formula as described above for CR_ID1_avg_air. The diagnostic mode flag CR_ID_mode is then set to "3", step 808.

Figure 9:
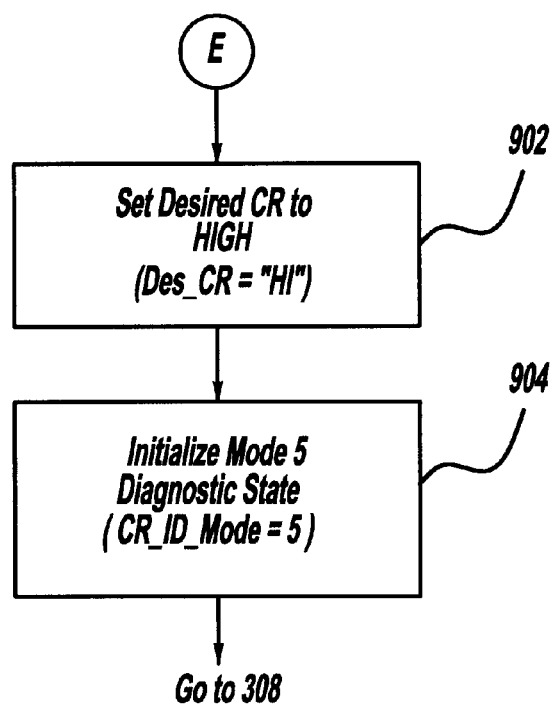
FIG. 9 is a flow diagram corresponding to a fifth diagnostic state of the method of FIG. 3.

FIG. 9 shows a flow diagram corresponding to a fifth diagnostic state (CR_ID_mode=4) of the method of FIG. 3. The fifth diagnostic state involves setting the desired compression ratio (Des_CR) back to the initial compression ratio operating state, i.e., high compression, step 902, and setting CR_ID_mode to "5", step 904, to allow evaluation of the compression ratio setting apparatus, step 904.

Figure 10:
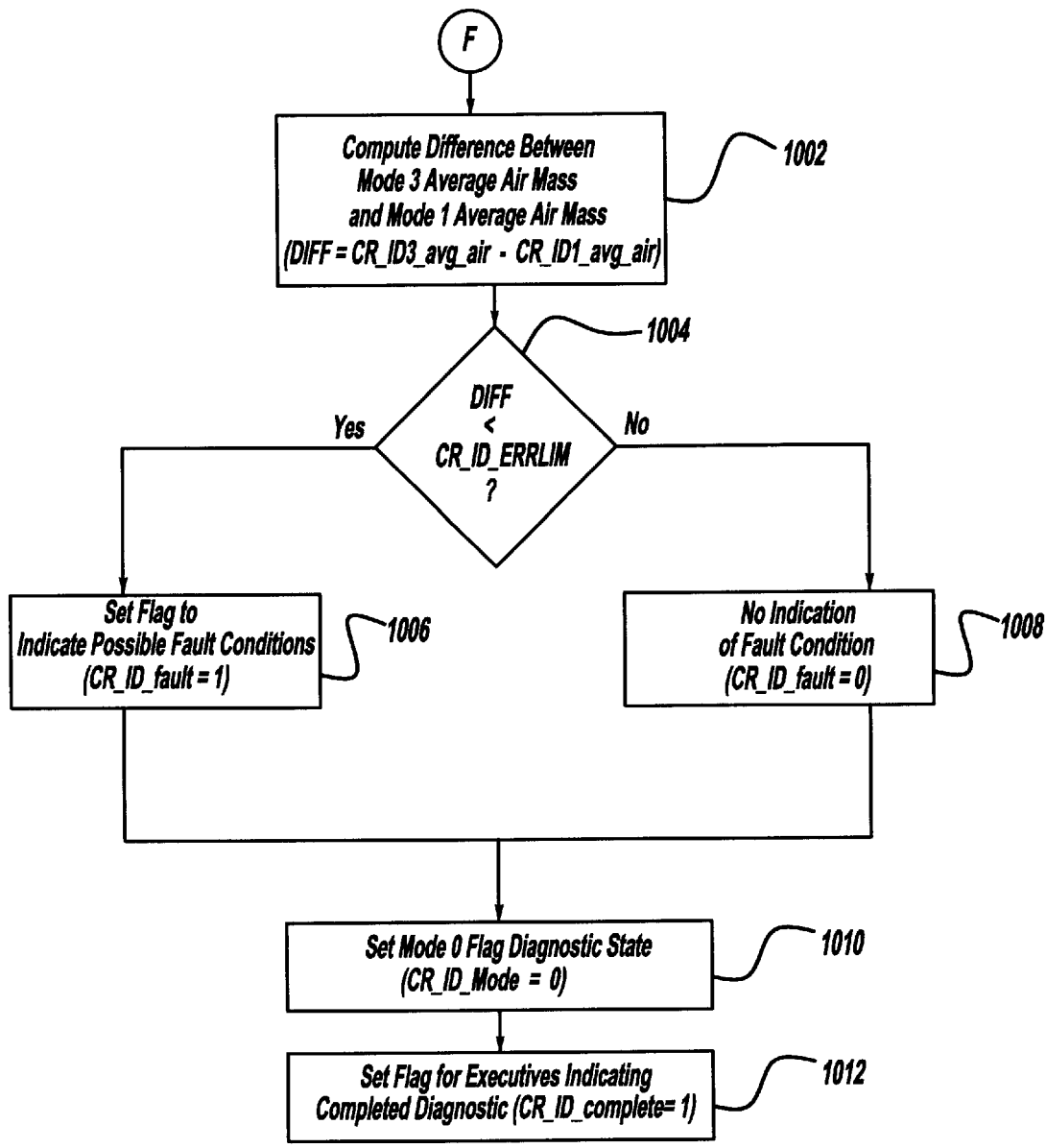
FIG. 10 is a flow diagram corresponding to a sixth diagnostic state of the method of FIG. 3.

FIG. 10 is a flow diagram corresponding to a sixth diagnostic state (CR_ID_mode=5) of the method of FIG. 3. If CR_ID_mode=5, then step 1002 is performed to determine a difference value (DIFF) between the mode 3 and mode 1 average air flows CD_ID3_avg_air and CD_ID1_avg_air, respectively. The purpose is to determine a difference in the idle air flow at high versus low compression, i.e., as the compression ratio setting apparatus decreases the compression ratio of the engine, an increase in idle air flow is expected due to the lower thermal efficiency of the engine at the lower compression ratio. Thus, if the change in mode 3 idle air flow (air flow at low compression) does not exceed a predetermined amount, then it is inferred that the compression ratio setting device may not have operated as intended. This is determined by comparing DIFF to a predetermined limit (CR_ID_ERRLIM) stored in computer memory, step 1004. CR_ID_ERRLIM can be determined empirically from engine test and/or calibration data. If DIFF is less than CR_ID_ERRLIM, an operational status flag (CR_ID_fault) is set to "1" to indicate a possible fault condition associated with the operation of the compression ratio setting apparatus, step 1006. Otherwise, CR_ID_fault is set to "0" in accordance with step 1008. CR_ID_mode is then set to "0" and a diagnostic status flag (CR_ID_complete) set to "1" upon completion of the diagnostic test, steps 1010 and 1012.

In the diagnostic indicates a possible fault condition, appropriate measures may be taken by a vehicle or engine controller to put the engine in a "limp home" mode, or to configure the compression ratio setting apparatus in one or more selected operating modes. In addition, a corresponding visible, audible or other diagnostic signal can be generated to inform a vehicle operator of a possible fault condition related to the compression ratio setting apparatus. For example, a diagnostic icon or other dash-mounted display can be illuminated or activated or a text message displayed instructing the driver to service the vehicle. The fault condition may also be verified or confirmed using other engine sensors and diagnostic procedures.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed:

1. A method for diagnosing operation of an internal combustion engine having a plurality of compression ratio operating states, comprising:
   determining a first idle air flow as the engine is operated in a first of the compression ratio operating states;
   determining a second idle air flow as the engine is operated in a second of the compression ratio operating states; and
   evaluating operation of the internal combustion engine based at least in part on the first and second idle air flows.

2. The method according to claim 1, wherein said evaluating step comprises:
   determining a difference between the first idle air flow and the second idle air flow;
   comparing the difference to a predetermined limit;
   providing an indication of engine operation based on said comparison step.

3. A diagnostic method for an internal combustion engine having a compression ratio setting apparatus, the compression ratio setting apparatus being operable to configure the engine in a plurality of compression ratio operating states, the method comprising:
   determining a first idle air flow at a first of the compression ratio operating states;
   determining a second idle air flow at a second of the compression ratio operating states;
   comparing the first idle air flow to the second idle air flow; and
   evaluating operation of the variable compression setting device based at least in part on said comparison step.

4. The method according to claim 3, wherein:
   said step of determining the first idle air flow comprises averaging air flow measurements from an air mass flow meter coupled to the engine while the engine is operated in the first of the compression ratio operating states; and
   said step of determining the second idle air flow comprises averaging air flow measurements from the air mass flow meter while the engine is operated in the second of the compression ratio operating states.

5. The method according to claim 3, wherein said comparison step comprises:
   determining a difference between the first idle air flow and the second idle air flow; and
   comparing the difference to a predetermined limit.

6. The method according to claim 3, wherein said evaluating step comprises setting an operational status flag relating to the compression ratio setting apparatus.

7. A diagnostic method for a motor vehicle having an internal combustion engine, the internal combustion engine having a compression ratio setting apparatus operable to configure the engine in a high compression operating state and a low compression operating state, the method comprising:

commanding the compression ratio setting apparatus to operate the engine in the high compression operating state;

determining an average idle air flow while operating the engine in the high compression ratio operating state;

commanding the compression ratio setting apparatus to operate the engine in the low compression operating state;

determining an average idle air flow while operating the engine in the low compression ratio operating state;

determining a difference between the average idle air flow at the low compression operating state and the average idle air flow at the high compression operating state;

comparing the difference to a predetermined limit;

setting an operational status flag for the compression ratio setting apparatus based on said comparison step.

8. The method according to claim 7, further comprising the step of operating the engine in the high compression ratio operating state for a predetermined period of time while determining the average idle air flow at the high compression ratio operating state.

9. The method according to claim 7, further comprising the step of operating the engine in the low compression ratio operating state for a predetermined period of time while determining the average idle air flow at the low compression ratio operating state.

10. The method according to claim 7, further comprising the step of providing a vehicle operator an audible signal based on the operational status flag.

11. The method according to claim 7, further comprising the step of providing a visible signal based on the operational status flag.

12. The method according to claim 7, further comprising the step of determining the existence of requisite engine operating conditions prior to said steps of determining the idle air flow.

13. The method according to claim 12, wherein said step of determining the existence of requisite engine operating conditions comprises:

determining the temperature of said engine; and comparing the engine temperature to a predetermined minimum temperature.

14. The method according to claim 12, wherein said step of determining the existence of requisite engine operating conditions comprises determining whether the engine is in an idle operating condition.

15. The method according to claim 12, wherein the engine is mechanically coupled to an automatic transmission and wherein said step of determining the existence of requisite engine operating conditions comprises determining whether the transmission is in a drive state.

16. The method according to claim 12, wherein the engine is mechanically coupled to a manual transmission and wherein said step of determining the existence of requisite engine operating conditions comprises determining whether the transmission is in a neutral state.

17. A system for operating an internal combustion engine having a plurality of compression ratio operating states, the system comprising:

a sensor disposed within the engine for generating a signal representative of idle air flow into the engine;

a compression ratio setting apparatus for configuring the engine in selected ones of the compression ratio operating states; and a controller in communication with said sensor and said compression ratio apparatus comprising computer program means for determining a first idle air flow of the engine as the engine is operated in a first of the compression ratio operating states, for determining a second idle air flow of the engine as the engine is operated in a second of the compression ratio operating states, and for evaluating operation of the internal combustion engine based at least in part on the first and second idle air flows.

18. The system according to claim 17, further comprising a notification device in communication with said controller for providing information relating to the operation of the compression ratio setting apparatus.

19. The system according to claim 17, further means for determining the existence of requisite engine operating conditions prior to evaluation of engine operation.

20. The system according to claim 17, further comprising:

a temperature sensor coupled to the engine an in communication with the controller; and computer program means for comparing the engine temperature to a predetermined minimum temperature.

21. The system according to claim 17, further comprising computer program means for determining whether the engine is in an idle operating condition.

22. The system according to claim 17, further comprising:

an automatic transmission mechanically coupled to the engine; and means for determining whether the transmission is in a drive state.

23. The system according to claim 17, further comprising:

a manual transmission mechanically coupled to the engine; and means for determining whether the transmission is in a neutral state.

* * * * *